(12) United States Patent
Stewart, III

(10) Patent No.: US 7,650,698 B2
(45) Date of Patent: Jan. 26, 2010

(54) VISUAL DRIVING AID

(76) Inventor: Charles Dean Stewart, III, 19 Willow Lake Dr., Colts Neck, NJ (US) 07722

( * ) Notice: Subject to any disclaimer, the term of this patent is extended or adjusted under 35 U.S.C. 154(b) by 424 days.

(21) Appl. No.: 11/520,358

(22) Filed: Sep. 14, 2006

(65) Prior Publication Data

US 2007/0210902 A1    Sep. 13, 2007

Related U.S. Application Data

(60) Provisional application No. 60/780,492, filed on Mar. 9, 2006.

(51) Int. Cl.
*G01B 11/26* (2006.01)
*G01C 21/00* (2006.01)
(52) U.S. Cl. ........................................ 33/264; 116/28 R
(58) Field of Classification Search .................. 33/264, 33/276, 277; 116/28 R, 35 R, 42
See application file for complete search history.

(56) References Cited

U.S. PATENT DOCUMENTS

| | | | | |
|---|---|---|---|---|
| 3,834,036 A * | 9/1974 | Scarritt, Sr. | ................... | 33/264 |
| 4,079,519 A * | 3/1978 | Carmouche | ................... | 33/264 |
| 4,928,393 A * | 5/1990 | Van Schaack | ................. | 33/264 |
| 4,941,263 A * | 7/1990 | Hirshberg | ..................... | 33/264 |
| 5,052,113 A * | 10/1991 | Aquino | ......................... | 33/264 |
| 6,198,386 B1 * | 3/2001 | White, II | ..................... | 340/435 |
| 6,602,006 B2 * | 8/2003 | Saksa | .......................... | 400/611 |
| 6,688,007 B2 * | 2/2004 | Ferron | .......................... | 33/264 |
| 6,734,786 B2 * | 5/2004 | Hoholik | ................... | 340/425.5 |
| 6,772,525 B2 * | 8/2004 | Newcomer | .................... | 33/286 |
| 7,043,342 B1 * | 5/2006 | Dewees | ........................ | 33/264 |
| 2002/0174822 A1 * | 11/2002 | Royal | ........................ | 116/28 R |

* cited by examiner

*Primary Examiner*—Yaritza Guadalupe-McCall
(74) *Attorney, Agent, or Firm*—Clifford G. Frayne

(57) ABSTRACT

A visual driving aid secured or projected onto a portion of the windshield of a vehicle which allows the vehicle operator to determine and project the wheel path of the vehicle in the advance road surface, the visual driving aid being an indicia on the windshield in front of the driver, the positioning or projection of the indicia taking into account the sight characteristics of the individual user so as to allow the user to determine and project the wheel path of the vehicle while in motion in order to aid the user in the avoidance of hazardous situations.

5 Claims, 3 Drawing Sheets

VISUAL DRIVING AID

RELATED APPLICATIONS

Applicant claims priority from provisional application Ser. No. 60/780,492, filed Mar. 9, 2006.

BACKGROUND OF THE INVENTION

1. Field of the Invention

The present invention relates to a visual driving aid, and more particularly, to an indicia placed or projected onto the windshield of a vehicle, which indicates to the driver or allows the driver to project the vehicles wheel path lines into the distance.

2. Description of the Prior Art

In operating a vehicle, the curb line, center line, or in multi-lane traffic, the lane lines provide the driver with an indication or reference point as to the location of the driver's vehicle, vis-à-vis other lanes and other traffic. However, the driver has no indication or reference point as to the path between these reference lines that the vehicles wheels are traveling or projected to travel. Under perfect driving conditions, this would normally not be a concern, however, there are seldom perfect driving conditions. As an example, when driving at a moderate speed on either a single lane highway or multi-lane highway, the driver identifies a pot hole in the distance he needs to quickly ascertain whether or not his vehicle will pass over or to the side of the pot hole, such that the pot hole will not engage any of the wheels of the vehicle. This split second decision has to be made while evaluating the traffic around the vehicle, since in multi-lane highways, it may not be possible for the driver to make the necessary swerve in order to avoid the pot hole.

A similar but less dangerous situation arises when the driver is parking the vehicle next to a curb. The driver uses a sense of distance or his relationship with other parked vehicles to position his vehicle at an appropriate distance from the curb.

Applicant's novel visual driving aid would eliminate the guesswork in the above identified situations and allow the driver to know at all times exactly the projected line which the wheels of the vehicle in which he is driving will take.

OBJECTS OF THE INVENTION

An object of the present invention is to provide for a novel visual driving aid for a driver which indicates and projects the path to be taken by the wheels of the vehicle being operated.

A still further object of the present invention is to provide for a novel visual driving aid which is positioned on the windshield of a vehicle and which allows the driver to project the wheel path of the vehicle in advance.

A still further object of the present invention is to provide for a novel visual driving aid which is projected onto a portion of the windshield and which allows the driver to project the wheel path of the vehicle in advance.

A still further object of the present invention is to provide for a novel visual driving aid either attached or projected onto the windshield of the vehicle being operated, which visual driving aid does not detract from the driver's ability to see out of the windshield.

A still further object of the present invention is to provide for a novel visual driving aid which is effective in both daylight and darkness for projecting the wheel path of the vehicle in advance.

A still further object of the present invention is to provide for a novel visual driving aid which would aid both new, elderly and experienced drivers.

SUMMARY OF THE INVENTION

A visual driving aid secured or projected onto a portion of the windshield of a vehicle which allows the vehicle operator to determine and project the wheel path of the vehicle in the advance road surface, the visual driving aid being an indicia on the windshield, the positioning or projection of the indicia taking into account the sight characteristics of the individual user so as to allow the user to determine and project the wheel path of the vehicle while in motion in order to aid the user in the avoidance of hazardous situations.

BRIEF DESCRIPTION OF THE DRAWINGS

These and other objects of the present invention will become apparent, particularly when taken in light of the following illustrations wherein.

DETAILED DESCRIPTION OF THE INVENTION

Figure 1:
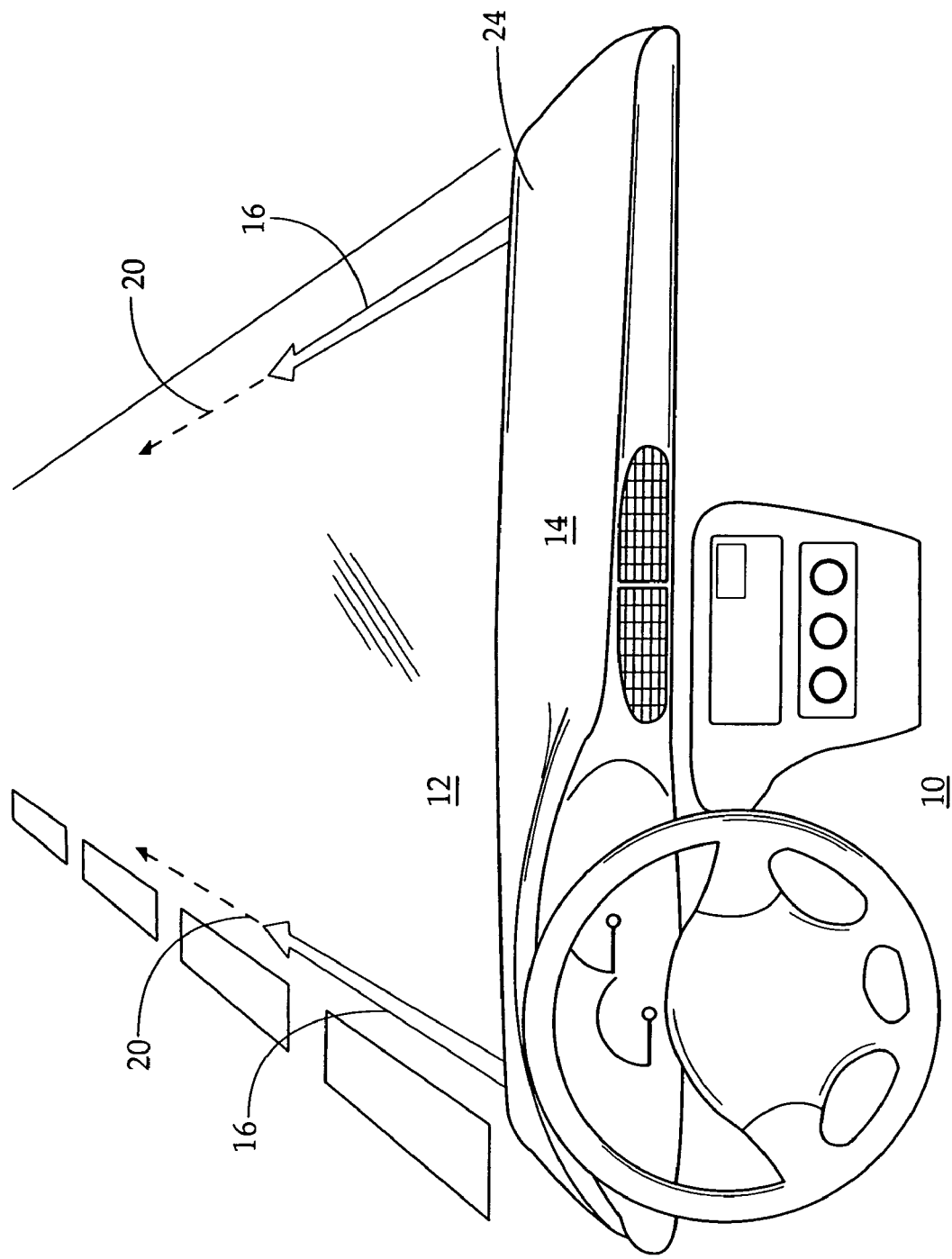
FIG. 1 is an interior view from the driver seat of a windshield on a vehicle in which the visual driving indicia decal aid has been positioned.
Figure 2:
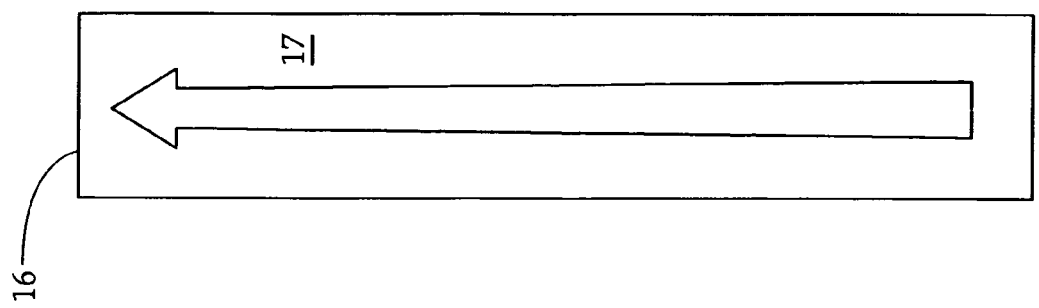
FIG. 2 is a side and front view of the structure of the visual driving aid indicia decal as applied to the windshield.
Figure 2:
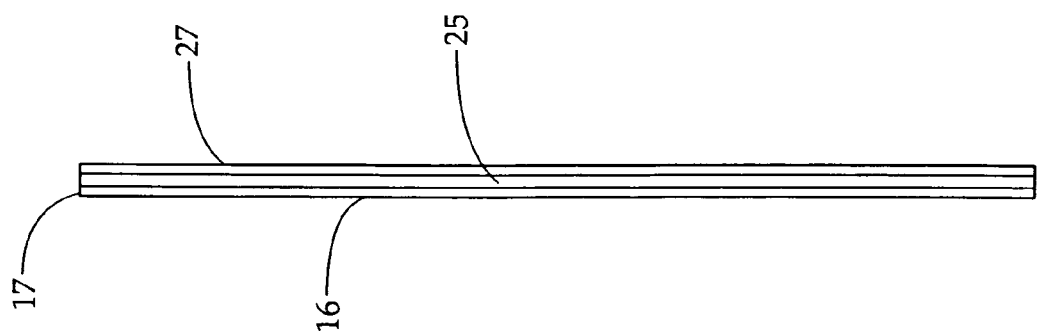

FIG. 1 is an interior view from the front seat 10 of the windshield 12 and dashboard 14 of a vehicle. FIG. 1 illustrates the placement of a visual driving indicia aid 16 on the windshield 12 generally in front of the driver. This visual driving aid indicia 16 in one embodiment shown in decal 18 form is illustrated in FIG. 2. The visual driving indicia aid 16 is, preferably a decal in the form of a linear line or an arrow 20 which is positioned on the interior of the windshield extending upwardly from the intersection of the windshield 12 and the dashboard 14. The visual driving indicia aid 16 can consist of an arrow or merely a linear line of sufficient length that when viewed by the driver, the line extends beyond the visual edge of the hood 24 of the vehicle as viewed from the driver seat.

The visual driving indicia aid 16 may be formed with an adhesive 25 on one side to secure to the interior of the windshield 12 in a semi-permanent status or it may be formed with a hydrophobic which allows for the driver to remove it and reposition it utilizing the same light adhesive. A removable overlay or protective peel layer 27 may also protect the adhesive and be removed before application.

Still further, the visual driving indicia aid 16 may be formed of any color, however, it would be preferred that if one drives significant amounts of time at night that the visual driving indicia aid 16 have a light reflecting emanating composite formed therein causing it to glow in the dark to aid in the viewing by the driver. The indicia itself could be positioned on transparent film so that when attached to the interior of the windshield only the indicia would be visible.

The positioning of the visual driving indicia aid 16 is determined by the individual driver by performing the following steps. Initially the driver determines his or her dominant eye. This is accomplished by holding up a finger in vertical orientation and aligning it with a vertical line (i.e. door frame) with both eyes open. The driver then selectively sequentially closes the left eye and then the right eye. The finger will remain aligned with the vertical reference with either the left eye or the right eye, but not both. The viewing eye which maintains alignment is the dominant eye.

The driver would then position his vehicle in a large parking lot or similar venue which offers to the driver a visual line of some distance such as a lane line or parking line. The driver would then park the passenger side tires of the vehicle on this extended line. The driver, while sitting in a normal fashion in the driver's seat, would then close his non-dominant eye and have positioned a first visual driving indicia aid 16 on the windshield 12 in alignment with the extended line upon which the passenger side wheels are positioned. (An assistant may be required for this step.) Once determining this location, the driver or assistant would peel off the protective layer and secure the visual driving indicia aid 16 in alignment with the extended line on the windshield.

The driver would repeat this procedure with respect to the driver's side wheels. The driver would park the driver's side wheels on the extended line, close his non-dominant eye and position a second visual driving indicia aid 16 on the windshield 12 in alignment with the extended line on the driver's wheel side of the vehicle. Once the correct positioning had been determined, a protective peel layer would be removed and the second visual driving indicia aid 16 would be positioned onto the windshield. The indicia 16 would extend visually beyond the threshold edge 24 of the hood.

The visual indicia driving aids 16 thus positioned allow the driver to determine the projected path 20 of the wheels of the vehicle while in motion by simply blinking his non-dominant eye while focusing the dominant eye on the roadway and allowing his or her peripheral vision to register the path of the vehicle wheels. In this manner, while driving on a highway at some speed, if the driver detects a pothole in the distance, a quick blink of the non-dominant eye and reference to the visual driving indicia aids 16 will tell the driver if his passenger side wheel or his driver side wheels are likely to engage the pothole and allows the driver to determine what action is necessary in order to avoid the hazard.

Similarly, the visual driving indicia aid 16 can aid the driver in parking his vehicle curbside by allowing him to approximate the distance from the passenger side wheels of the vehicle to the curb by utilizing the passenger side visual driving indicia.

Figure 3:
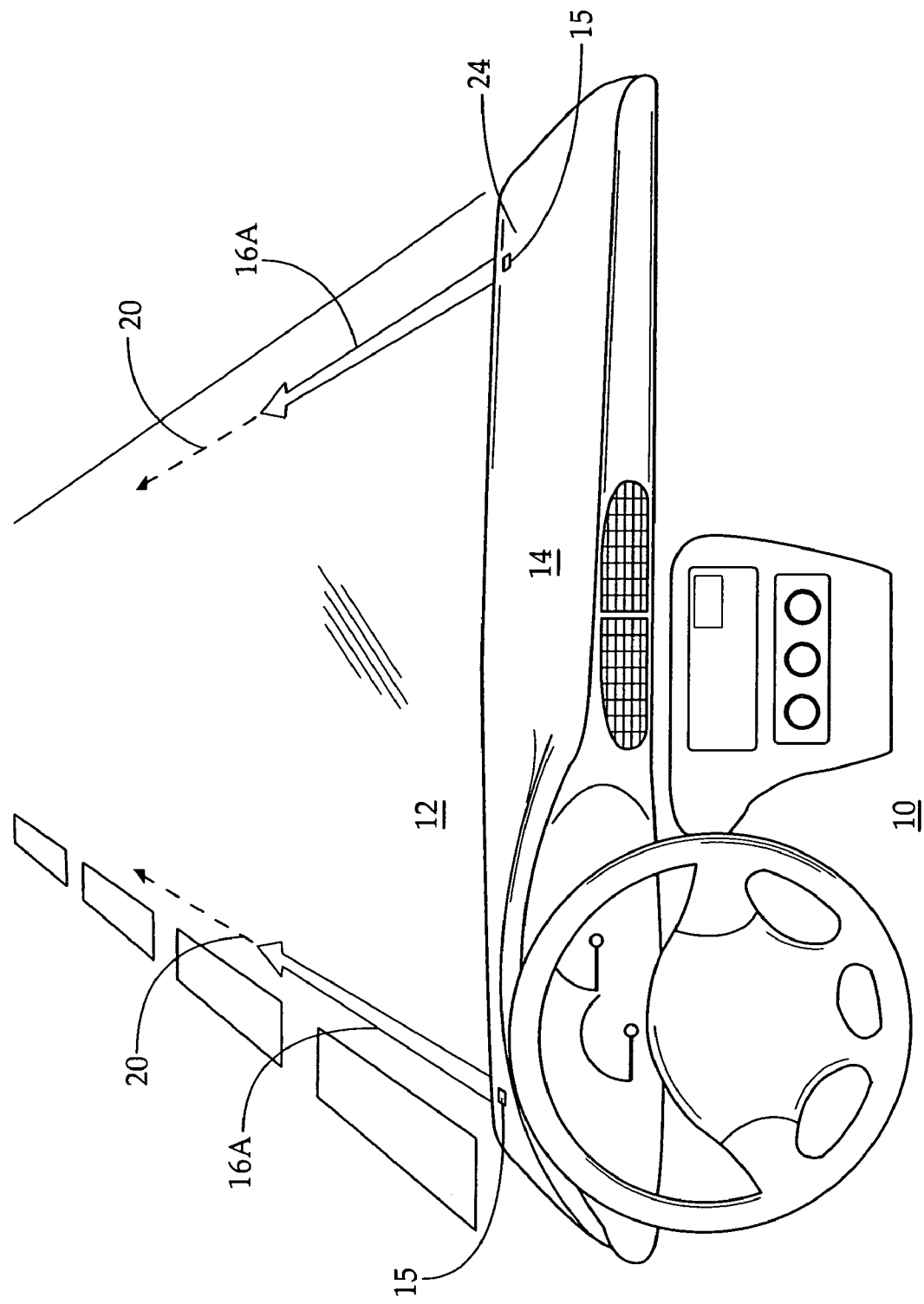
FIG. 3 is an interior view from the driver seat of a windshield incorporating a second embodiment of the visual driving indicia in the form of a projected light beam or laser.

The present invention has been described with respect to a visual driving indicia aid 16 of the decal type that can be positioned on the interior of the windshield. It will be recognized and appreciated by those of ordinary skill in the art that technology exists for displaying indicia and information onto a visual panel in front of a user. This technology is used in military aircraft. It is therefore considered within the scope of the disclosure that in lieu of a physical decal serving as the visual driving indicia aid 16, the same type of visual driving indicia aid 16A (See FIG. 3) could be projected onto the windshield 12 from slidably adjustable dashboard projectors 15 and could be adjusted in the same manner as described herein with the driver of the vehicle adjusting the passenger side visual aid and the driver side visual aid by positioning the respective wheels of the vehicle on an extended line and adjusting the projected visual driving indicia. In this manner the projection of the visual driving indicia would be activated when the vehicle was started and would allow the driver the same benefits as the decal type indicia, namely, being able to project the path of the wheels of the vehicle so as to allow the driver to more accurately anticipate possible hazards in advance and respond to same.

In either embodiment the visual driving aid 16 would extend beyond the visual edge of the hood 24 to provide the driver of projected wheel path multiple car lengths in advance of his or her vehicle.

While the visual driving aid indicia 16 of the present invention has been described with respect to its positioning to verify the projected path of the wheels of a vehicle, there oftentimes arises a situation where a vehicle is towing a trailer or an RV which is slightly wider than the vehicle which is doing the towing. In such an instance, the wheels of the trailer or RV may be positioned on a wider axle than that of the towing vehicle. In such an instance, the driver of the towing vehicle may find it advantageous to know the path that the wheels of the trailer or RV are going to take as opposed to the path of the wheels of the towing vehicle. In such an instance, visual driving aid indicia could be repositioned by the method previously described, only in this embodiment, the driver would place the wheels of the trailer or RV on the extended line in order to position the driving aid indicia 16. Alternatively, the driver could merely position a second pair of driving aid indicias on the windshield to identify the path of the wheels of the trailer or RV.

The visual driving aid 16 thus disclosed is a safety aid for vehicles traveling at moderate to speed limit velocity. It is not useful in bumper to bumper traffic or in situations where right or left hand turns at slow speed are encountered.

While the present invention has been described with respect to the exemplary embodiments thereof, it will be recognized by those of ordinary skill in the art that many modifications or changes can be achieved without departing from the spirit and scope of the invention. Therefore it is manifestly intended that the invention be limited only by the scope of the claims and the equivalence thereof.

I claim:

1. A visual driving aid which projects the path of the wheels of a vehicle to the driver in order to avoid approaching hazards in the roadway, said visual driving aid comprising:

first and second wheel alignment markers, each of said wheel alignment markers having a linear indicia, each of said wheel alignment markers positioned on the interior windshield of a vehicle, said first alignment marker positioned on the driver's side portion of said windshield, and said second wheel alignment marker positioned on passenger side of said windshield, said first and second wheel alignment markers positioned in accordance with a dominant eye of said driver, whereby when said wheel alignment markers are attached to said vehicle windshield, a driver seated in a driving position can observe the projected path of said wheels of said vehicle by blinking said driver's non-dominant eye and viewing said first and second wheel alignment marker while facing straight ahead allowing said driver to anticipate hazards in the roadway in advance of the vehicle.

2. The visual driving aid in accordance with claim 1 wherein said first and second wheel alignment markers comprise a transparent plastic film having a linear indicia formed thereon, and having a removably replaceable adhesive on an opposing side of said indicia for attachment of said visual driving aid to said windshield, said linear indicia further having a reflecting glow in the dark composite formed therein.

3. The visual driving aid in accordance with claim 2, wherein said visual driving aid comprises a flexible sheet of transparent material, said material having an inner surface being hydrophobic, said outer surface having a linear indicia formed thereon, said hydrostatic adhesive surface removably securable to said vehicle windshield.

4. A visual driving aid in accordance with claim 1, wherein said wheel alignment markers a comprise projection of light onto said windshield from a projector on a dashboard defining a linear indicia cooperable with said dominant eye of said driver for determining said projected path of said wheels of said vehicle.

5. A visual driving aid in accordance with claim 1, wherein said first and second lane alignment markers can be positioned in spaced apart relationship on said windshield of said vehicle to project the lines of the wheels of a trailer being towed by a vehicle, wherein said trailer has a wheel axle length greater than the wheel axle length of the vehicle towing.

\* \* \* \* \*